United States Patent
Lev

(10) Patent No.: US 10,832,444 B2
(45) Date of Patent: Nov. 10, 2020

(54) SYSTEM AND METHOD FOR ESTIMATING DEVICE POSE IN A SPACE

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 90 days.

(21) Appl. No.: 16/278,206

(22) Filed: Feb. 18, 2019

(65) Prior Publication Data

US 2020/0265607 A1    Aug. 20, 2020

(51) Int. Cl.
*G06K 9/00*       (2006.01)
*G06T 7/73*       (2017.01)
*G06T 7/11*       (2017.01)
*G06T 7/174*      (2017.01)

(52) U.S. Cl.
CPC ............ *G06T 7/75* (2017.01); *G06T 7/11* (2017.01); *G06T 7/174* (2017.01); *G06T 2207/10032* (2013.01); *G06T 2207/20081* (2013.01); *G06T 2207/20084* (2013.01); *G06T 2207/30244* (2013.01); *G06T 2207/30252* (2013.01)

(58) Field of Classification Search
CPC ... G06T 7/75; G06T 7/174; G06T 7/11; G06T 2207/20081; G06T 2207/30252; G06T 2207/10032; G06T 2207/20084; G06T 2207/30244
See application file for complete search history.

(56) References Cited

U.S. PATENT DOCUMENTS

| | | | | |
|---|---|---|---|---|
| 5,459,636 A * | 10/1995 | Gee | ...................... | G06K 9/6203 382/199 |
| 6,748,112 B1 * | 6/2004 | Nguyen | ................ | F01D 21/003 348/92 |
| 8,837,778 B1 * | 9/2014 | Chang | .................... | G06T 7/251 382/103 |
| 9,921,335 B1 * | 3/2018 | Keal | ...................... | G06F 1/1694 |
| 2003/0099395 A1 * | 5/2003 | Wang | ................ | H04N 1/00774 382/165 |
| 2011/0208496 A1 * | 8/2011 | Bando | .................... | G01S 19/49 703/2 |
| 2012/0007943 A1 * | 1/2012 | Tytgat | .................... | G01B 11/22 348/14.08 |
| 2012/0099400 A1 * | 4/2012 | Debrunner | .............. | G01S 15/89 367/99 |
| 2012/0170835 A1 * | 7/2012 | Wang | .................. | G06K 9/6265 382/159 |

(Continued)

*Primary Examiner* — Aaron W Carter

(57) ABSTRACT

A system for estimating a plurality of device poses in a space, comprising: at least one device, comprising at least one hardware processor connected to at least one sensor and adapted to: in at least one of a plurality of iterations: using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space; providing the first estimated device pose to at least one software object executed by the at least one hardware processor to perform a pose-oriented task; receiving at least one other model trained to compute another estimated device pose in a second.

22 Claims, 6 Drawing Sheets

(56) References Cited

U.S. PATENT DOCUMENTS

| | | | |
|---|---|---|---|
| 2013/0251244 A1* | 9/2013 | Wei | G06K 9/00281 |
| | | | 382/159 |
| 2014/0321735 A1* | 10/2014 | Zhang | G06T 7/75 |
| | | | 382/154 |
| 2015/0092178 A1* | 4/2015 | Debrunner | G01S 7/4808 |
| | | | 356/4.01 |
| 2015/0243031 A1* | 8/2015 | Narasimha | G06K 9/6256 |
| | | | 382/103 |
| 2016/0148433 A1* | 5/2016 | Petrovskaya | G02B 27/01 |
| | | | 345/633 |
| 2017/0261989 A1* | 9/2017 | Ishioka | G01C 21/34 |
| 2017/0278231 A1* | 9/2017 | Narasimha | G06T 7/246 |
| 2018/0124256 A1* | 5/2018 | Kawamura | H04M 19/04 |
| 2018/0158209 A1* | 6/2018 | Fine | G06T 7/70 |
| 2018/0365890 A1* | 12/2018 | Ryde | G06T 17/05 |
| 2020/0104458 A1* | 4/2020 | Chuang | G06F 30/327 |
| 2020/0193637 A1* | 6/2020 | Karasudani | G06T 7/543 |

\* cited by examiner

SYSTEM AND METHOD FOR ESTIMATING DEVICE POSE IN A SPACE

FIELD AND BACKGROUND OF THE INVENTION

The present invention, in some embodiments thereof, relates to classification based on signal processing and, more specifically, but not exclusively, to estimating a pose in a space of a signal capturing device.

There exist systems comprising a device comprising a sensor, for example an imaging sensor such as a camera, where there is a need to estimate a pose of the device in a space. A device pose is a combination of position and orientation of the device relative to a coordinate system or relative to at least one of a plurality of predefined poses. Some examples of a space are a geographical area and a building. For example, some navigation systems provide navigation instructions according to a moving device's pose in a space, for example in a geographical area. In another example, some augmented reality (AR) systems display one or more images according to a person's pose in a space, for example in a building. Some other examples of a system where there is a need to estimate a device's pose are a virtual reality (VR) system, a guidance system, and a security system. An example of a coordinate system is a world coordinate system, for example a coordinate system of a Global Positioning System (GPS). Another example of a coordinate system is a coordinate system calibrated with one of a plurality of predefined poses of a sensor when capturing a first signal.

SUMMARY OF THE INVENTION

It is an object of the present invention to provide a system and a method for estimating a pose in a space of a signal capturing device.

The foregoing and other objects are achieved by the features of the independent claims. Further implementation forms are apparent from the dependent claims, the description and the figures.

According to a first aspect of the invention, a system for estimating a plurality of device poses in a space comprises at least one device, comprising at least one hardware processor connected to at least one sensor and adapted to: in at least one of a plurality of iterations: using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space; providing the first estimated device pose to at least one software object executed by the at least one hardware processor to perform a pose-oriented task; receiving at least one other model trained to compute another estimated device pose in a second identified region of the space and selected from the plurality of region specific models according to the first estimated device pose; and using the at least one other model in at least one other iteration of the plurality of iterations to compute a second estimated device pose in the second identified region of the space.

According to a second aspect of the invention, a method for estimating a plurality of device poses in a space comprises executing on at least one hardware processor of a device code adapted to: in at least one of a plurality of iterations: using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space; providing the first estimated device pose to at least one software object executed by the at least one hardware processor to perform a pose-oriented task; receiving at least one other model trained to compute another estimated device pose in a second identified region of the space and selected from the plurality of region specific models according to the first estimated device pose; and using the at least one other model in at least one other iteration of the plurality of iterations to compute a second estimated device pose in the second identified region of the space.

According to a third aspect of the invention, a system for navigating in a space comprises at least one device, comprising at least one hardware processor connected to at least one sensor and adapted to: in each of a plurality of iterations: computing an estimated device pose; and computing at least one navigation instruction according to the estimated device pose; wherein computing the estimated device pose comprises: in at least one of the plurality of iterations: using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space; providing the first estimated device pose to at least one software object executed by the at least one hardware processor to perform a pose-oriented task; receiving at least one other model trained to compute another estimated device pose in a second identified region of the space and selected from the plurality of region specific models according to the first estimated device pose; and using the at least one other model in at least one other iteration of the plurality of iterations to compute a second estimated device pose in the second identified region of the space.

According to a fourth aspect of the invention, a system for providing a plurality of region specific models comprises at least one hardware processor executing a code adapted to: for each of one or more devices connected to the at least one hardware processor, while the device is moving from a first position of the device in a space to a second position of the device in the space: receiving from the device at least one first message comprising a first estimated position, estimating the first position of the device in the space; analyzing the first estimated position to determine at least one relevant region of the space; transmitting to the device at least one response comprising at least one relevant region specific model associated with the at least one relevant region of the space; and receiving from the device at least one second message comprising a second estimated position, estimating the second position of the device in the space.

With reference to the first and second aspects, in a first possible implementation of the first and second aspects of the present invention, the at least one model is a neural network.

Using a neural network improves accuracy of an output of the at least one model compared to some other models such as some computer vision models, or some statistical models.

With reference to the first and second aspects, in a second possible implementation of the first and second aspects of the present invention, the at least one hardware processor is adapted to receiving the at least one other model from at least one other hardware processor via at least one digital communication network interface connected to the at least one hardware processor. Optionally, the at least one digital communication network interface is connected to at least one wireless digital communication network. Optionally, the at least one digital communication network interface is selected from a group of network interfaces consisting of: a Bluetooth network interface, a network interface based on at least one protocol of Institute of Electrical and Electronics Engineers 802.11 (IEEE 802.11) family of protocols, a Global System for Mobile communications (GSM) network interface and a Long Term Evolution (LTE) network interface. Using a wireless digital communication network allows the at least one device to move while communicating with the at least one other hardware processor.

With reference to the first and second aspects, in a third possible implementation of the first and second aspects of the present invention, the at least one sensor is at least one imaging sensor, the at least one signal is at least one digital image captured by the at least one imaging sensor, and each of the plurality of region specific models, trained to compute an estimated device pose in one of a plurality of regions of the space, is trained with a plurality of images of respective region of the space. Using at least one imaging sensor increases accuracy of an output of the at least one model compared to using another type of sensor such as a passive infrared sensor. Optionally, the plurality of images of respective region of the space comprises a plurality of captured images captured by at least one other imaging sensor. Using captured images of a region of the space to train a respective region specific model increases accuracy of an output of the region specific model compared to an output of a model trained using another plurality of captured images of the entire space. Optionally, the plurality of images of respective region of the space comprises a plurality of synthetic images generated by at least one rendering engine. Using a plurality of synthetic images to train a region specific model increases an output of the region specific model compared to a region specific model trained using only a plurality of captured images.

With reference to the first and second aspects, in a fourth possible implementation of the first and second aspects of the present invention, the first estimated device pose is relative to a coordinate system of a Global Positioning System (GPS). Optionally, the first estimated device pose is relative to an identified coordinate system of the space. Using an identified coordinate system allows computing an estimated device pose not covered by a GPS, for example inside a building, or distinguishing between multiple levels of a highway crossing. Optionally, the space is interior to a building.

With reference to the first and second aspects, in a fifth possible implementation of the first and second aspects of the present invention, the pose-oriented task comprises controlling movement of the at least one device in the space. Optionally, the pose-oriented task comprises computing a path to an identified pose in the space. Optionally, the pose-oriented task comprises displaying at least one pose-related image on an object in the space.

With reference to the fourth aspect, in a first possible implementation of the fourth aspect of the present invention, at least one of the one or more devices is moving from the first position in the space to the second position in the space by being mounted to a vehicle moving in the space. Optionally, the at least one of the one or more devices is an autonomous vehicle moving in the space. Optionally, the autonomous vehicle is selected from a group of autonomous vehicles consisting of: an autonomous land vehicle, and an autonomous flying drone.

With reference to the fourth aspect, in a second possible implementation of the fourth aspect of the present invention, the at least one first message further comprises an estimated orientation, associated with the first estimated position to form a first estimated pose of the device. The at least one hardware processor is further adapted to execute a code for analyzing the first estimated pose to determine the at least one relevant region of the space. Determining the at least one relevant region of the space according to an estimated device pose comprising an estimated orientation in addition to an estimated device position increases accuracy of determining the at least one relevant region compared to determining the at least one relevant region according to an estimated position alone, and thus increase accuracy of an output of a device using the at least one relevant region specific model.

With reference to the fourth aspect, in a third possible implementation of the fourth aspect of the present invention, the at least one of the one or more devices comprises at least one device hardware processor adapted to in at least one of a plurality of iterations: using at least one region specific model to compute a first estimated device pose in a first identified region of the space in response to at least one input signal captured by at least one sensor, where the at least one region specific model is one of a plurality of region specific models, each trained to compute an estimated device pose in one of a plurality of regions of the space; providing the first estimated device pose to at least one software object executed by the at least one device hardware processor to perform a pose-oriented task; receiving at least one other region specific model trained to compute another estimated device pose in a second identified region of the space and selected from the plurality of region specific models according to the first estimated device pose; and using the at least one other region specific model in at least one other iteration of the plurality of iterations to compute a second estimated device pose in the second identified region of the space. The first estimated device pose comprises the first estimated position, and the second estimated device pose comprises the second estimated position.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
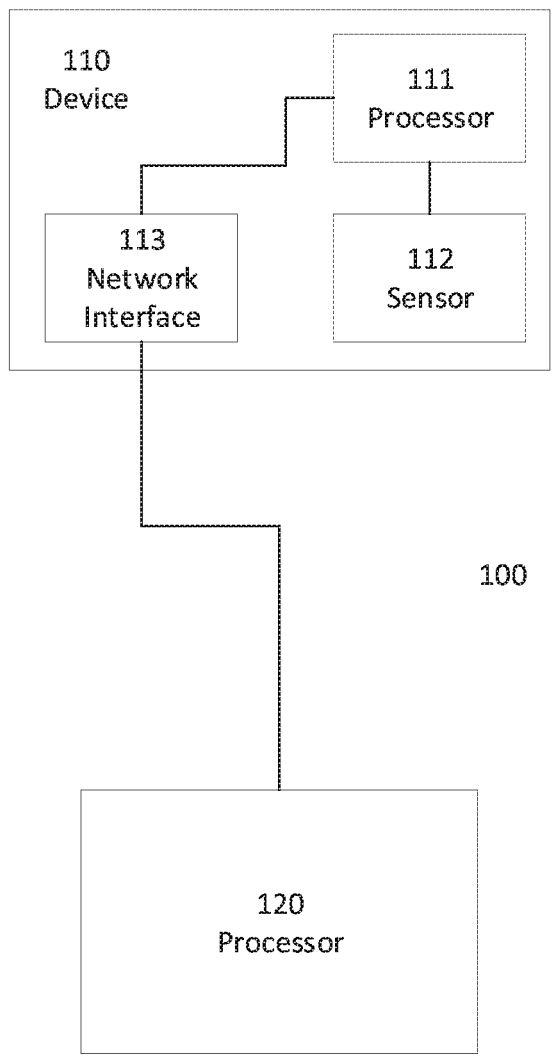
FIG. 1 is a schematic block diagram of an exemplary system for estimating a plurality of device poses, according to some embodiments of the present invention.

The present invention, in some embodiments thereof, relates to classification based on signal processing and, more specifically, but not exclusively, to estimating a pose in a space of a signal capturing device.

Methods for estimating a device's pose typically comprise receiving one or more signals, captured by one or more sensors, and estimating the device's pose according to the one or more signals. Some examples of a sensor are an imaging sensor, such as a camera. Some types of cameras are: a two-dimensional camera, a three-dimensional camera, a visible light camera, and an infra-red camera. Some other examples of a sensor are a microphone, a radar, a far infra-red (FIR) sensor, a passive infra-red (PIR) sensor, a LIDAR, an acceleration sensor, and a velocity sensor.

Some methods of estimating a device's pose use a moving device's velocity and a respective time value to compute the device's pose relative to a known starting pose. For example, some robotic cleaning devices use such methods to navigate back to a home base. However, such methods tend to acquire an accumulated error over time and are thus not accurate. In addition, such methods are limited to computing the device's pose relative to a known starting pose and are not suitable for determining the device's pose in a space without calibrating the starting pose with a coordinate system of the space.

Some methods of estimating a device's pose use a model to estimate a pose in a space in response to one or more signals captured by one or more sensors. Some examples of a model are a statistical model and a neural network. Some existing methods require an accurate model of the space, a model which may be expensive and time consuming to acquire and maintain. Some other methods are sensitive to changes in the space, for example presence of people in the space, or change in an object such as furniture. In addition, some methods that use a model require for execution an amount of resources that cannot be implemented in some devices, for example an amount of storage. Other examples of resources that may limit execution of a method in a device are an amount of digital memory and an amount of power consumed when computing an estimated device pose according to the method.

Some methods for computing a device pose comprise using a remote processing unit to compute the device's pose in response to the one or more signals, however such methods require continuous communication between the device and the remote processing unit, for example using a digital communication network.

The present invention, in some embodiments thereof, proposes training each of a plurality of region specific models to compute an estimated device pose in one of a plurality of regions of a space, and using the plurality of region specific models to compute, in a plurality of iterations, a plurality of device poses in the space. The present invention, in some embodiments, proposes using in at least one of the plurality of iterations at least one of the plurality of region specific models to compute a first estimated device pose in a first identified region of the space, and receiving and then using in at least one other iteration of the plurality of iterations at least one other model of the plurality of region specific models to compute a second estimated device pose in a second identified region of the space. Optionally the at least one model is trained to compute an estimated device pose in the first identified region of the space and the at least one other model is trained to compute another estimated device pose in the second identified region of the space. Optionally, the at least one other model is selected from the plurality of region specific models according to the first device pose. Optionally, the first estimated device pose is computed by the at least one model in response to at least one input signal captured by at least one sensor. Optionally, the second estimated device pose is computed by the at least one other model in response to at least one other input signal captured by the at least one sensor.

Training each of the plurality of region specific models to compute an estimated device pose in one of the plurality of regions of the space reduces an amount of memory and an amount of power required to compute one estimated device pose compared to using an entire-space model trained to compute an estimated device pose in the entire space. In addition, an amount of storage required for each of the plurality of region specific models trained according to the present invention is less than an amount of storage required for the entire-space model. Selecting and receiving the at least one other model according to the first estimated device pose facilitates storing only some of the plurality of region specific models on the device and thus reduces an amount of storage required to compute the plurality of device poses compared to using the entire-space model.

Optionally, the present invention proposes providing the first estimated device pose to at least one software object. Optionally, the at least one software object performs a pose-oriented task. Some examples of a pose-oriented task are providing navigation instructions, guiding movement of the device in the space, displaying one or more pose-related images such as augmented reality and virtual reality, and issuing one or more pose-related alerts, such as in a security system. For example, in some embodiments of the present invention, in each of a plurality of navigation iterations at least one navigation instruction is computed according to an estimated device pose computed according to the present invention. Computing a navigation instruction according to an estimated device pose computed according to the present invention reduces cost of a device capable of navigating in the space compared to a device implemented using an entire-space model, as the present invention facilitates reducing cost of computing the estimated device pose.

In addition, according to some embodiments of the present invention, each of the plurality of region specific models is trained to compute an estimated device pose in one of a plurality of regions of the space with a plurality of images of respective region of the space. Using a plurality of region specific models each trained using a plurality of images of respective region of the space allows using the plurality of region specific models to estimate one or more device poses in a space that is interior to a building, where a satellite based positioning system cannot be used. Training a region specific model using a plurality of images of a region of the space, as opposed to using another plurality of images of the entire space, reduces an amount of time required to train the region specific model and increases accuracy of an output of the region specific model. Optionally, the plurality of images of the region of the space comprises a plurality of captured images captured by at least one other imaging sensor. Using a plurality of captured images when training a region specific model increase accuracy of an output of the region specific model. Optionally, the plurality of images of the region of the space comprises a plurality of synthetic images generated by at least one rendering engine. Using a plurality of synthetic images reduces cost of increasing an amount of images used in training the region specific model which in turn increase accuracy of an output of the region specific model, by facilitating creation of images not captured by the at least one other images sensor: additional viewing angles, introduction of other objects such as people, furniture, vehicles, animals, etc., introduction of environmental factors such as illumination, fog, clouds, etc. and introduction of device related factors such as motion, jitter, shake, blur, obstructions to a lens, optical reflections internal to the device, etc.

Optionally, at least some of the plurality of region specific models are neural networks. A neural network, trained on input samples selected according to a region of the space, tends to produce output more accurate than some traditional computer vision and machine learning algorithms, for example when the captured one or more signal comprises addition or removal of an object and additionally or alternatively one or more changes to the physical characteristics of the region of the space. Some examples of an addition or removal of an object are a new picture hanging on a wall and removal of a table from a room. Some examples of a change to the physical characteristics of the region of the space are a change in a position of a door (open vs. closed), and an amount of illumination of a light (on vs. off). In addition, neural networks are effective at e.g. detecting humans or other known mobile objects (e.g. cars) and hence can remove those from their consideration when trying to establish the pose of the device. In addition, linear code execution may be effected by execution events such as an infinite loop, a buffer overflow or a buffer underflow. Neural networks are designed to be unaffected by such execution events and compute an output within an identified amount of time, and thus a neural network's output may be more accurate than output computed by executing a traditional computer vision algorithm, for example when execution is limited to an identified amount of time.

In addition, the present invention proposes, in some embodiments thereof, providing the plurality of region specific models to each of one or more devices moving in the space. In such embodiments, the present invention proposes receiving from a device of the one or more devices at least one first message comprising a first estimated position, estimating the first position of the device in the space, analyzing the first estimated position to determine at least one relevant region of the space, and transmitting to the device at least one response comprising at least one relevant region specific model, of the plurality of region specific models, associated with the at least one relevant region of the space. Optionally, the present invention proposes receiving from the device at least one second message comprising a second estimated position, estimating a second position of the device in the space. Optionally, the at least one first message and the at least one second message are received while the device is moving from the first position of the device in the space to the second position of the device in the space. Optionally, the device uses at least one relevant region specific model to compute the second estimated position.

Providing one or more of the plurality of region specific models to one or more devices while the one or more devices are moving in space allows reducing cost of one or more devices each capable of navigating in the space, compared to one or more devices each implemented using an entire-space model, as the present invention facilitates reducing cost of computing the estimated device position while the device is moving.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showings a schematic block diagram of an exemplary system 100 for estimating a plurality of device poses, according to some embodiments of the present invention. In such embodiments, at least one device 110 comprises at least one hardware processor 111 optionally connected to at least one sensor 112. Optionally, at least one hardware processor 111 is electrically coupled to at least one sensor 112. Optionally, at least one sensor 112 is at least one imaging sensor, for example a camera. Some examples of a camera are: a two-dimensional camera, a three-dimensional camera, a visible light camera, and an infra-red camera. Optionally, at least one sensor 112 is selected from a group of sensors comprising a microphone, a radar, a far infra-red (FIR) sensor, a passive infra-red (PIR) sensor, a LIDAR, an acceleration sensor, and a velocity sensor. Optionally, at least one hardware processor 111 is connected to at least one digital communication network interface 113. Optionally, at least one hardware processor 111 is electrically coupled to at least one digital communication network interface 113. Optionally, at least one digital communication network interface 113 is connected to at least one wireless digital communication network, for example a wireless network based on one or more of the Institute of Electrical and Electronics Engineers (IEEE) 802.11 family of protocols (Wi-Fi), or a Bluetooth Special Interest Group Bluetooth network. Optionally, at least one digital communication network interface 113 is connected to at least one cellular network, for example a code-division multiple access (CDMA) network, a Global System for Mobile communications network (GSM), a Universal Mobile Telecommunications System (UMTS) network, and a Long Term Evolution (LTE) network. Optionally, at least one hardware processor 111 is connected to at least one other processor 120 via at least one digital communication network interface 113, for example for the purpose of outputting an estimated device pose. Optionally, at least one hardware processor 111 receives one or more models from at least one other hardware processor 120, optionally for the purpose of computing one or more estimated device poses.

Optionally, at least one hardware processor 111 is connected to one or more audio components, for example a speaker, optionally for the purpose of outputting one or more results of performing a pose-oriented task executed in response to input comprising an estimated device pose, for example a navigation instruction. Optionally, at least one hardware processor 111 is connected to one or more display components, for example a screen, optionally for the purpose of outputting one or more results of performing the pose-oriented task.

Figure 2:
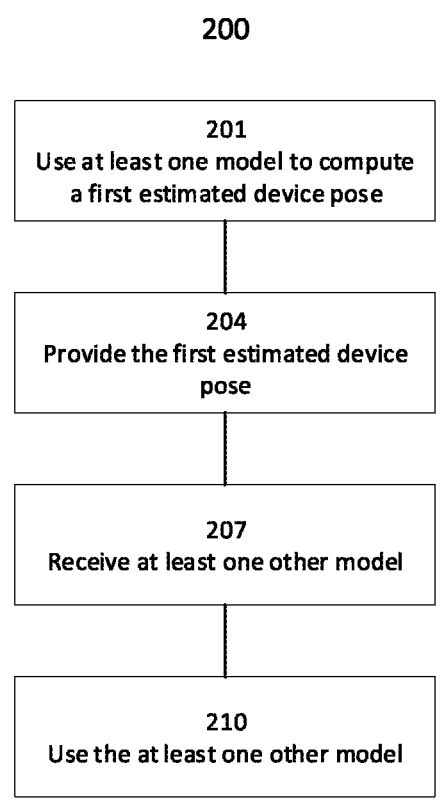
FIG. 2 is a flowchart schematically representing an optional flow of operations for estimating a plurality of device poses, according to some embodiments of the present invention.

Reference is now made also to FIG. 2, showing a flowchart schematically representing an optional flow of operations 200 for estimating a plurality of device poses, according to some embodiments of the present invention. In such embodiments, at least one hardware processor 111 executes a plurality of iterations. Optionally, in at least one of the plurality of iterations, at least one hardware processor 111 uses in 201 at least one model to compute a first estimated device pose in a first identified region of a space, in response to at least one input signal captured by at least one sensor 112. Optionally, the at least one model is a machine learning model. Optionally, the at least one model is a neural network. Optionally, the at least one model is a statistical model. Optionally, the at least one model is one of a plurality of region specific models, each trained to compute an estimated device pose in one of a plurality of regions of the space. Optionally, the at least one signal is at least one digital image, captured by at least one sensor 112, for example when at least one sensor 112 is at least one imaging sensor. Optionally, the first estimated device pose is relative to a coordinate system of a GPS. Optionally, the space is interior to a building. Optionally, the first estimated device pose is relative to an identified coordinate system of the space, for example a be-spoke coordinate system of the space. Optionally, each of the plurality of region specific models is trained with a plurality of images of respective region of the space. Optionally, the plurality of images of respective region of the space comprise a plurality of captured images, captured by at least one other sensor, for example at least one other imaging sensor. Optionally, the plurality of images of respective region of the space comprises a plurality of synthetic images, generated by at least one rendering engine. Optionally, the at least one rendering engine generates the plurality of synthetic images according to synthetic data describing the respective region of the space. Optionally, the at least one rendering engine generates the plurality of synthetic images by modifying one or more of another plurality of captured images, captured by the at least one other sensor. Optionally, modifying the one or more of the other plurality of captured images comprises one or more modifications selected from a set of image modification comprising: adding a new object, applying a pose transform, applying an environmental effect transform, and applying a device related transform. Some examples of a new object added to an image are a person, an animal, a vehicle, and an item of furniture. Some examples of an environmental effect transform are: increasing or reducing illumination, adding fog, and adding clouds. Some examples of a device related transform are: adding motion, adding jitter, adding shake, adding blur, simulating an obstruction on a sensor's lens, and adding one or more device-internal optical reflections. Optionally, each of the plurality of images has a location label indicative of a pose in the space. Optionally, each of the plurality of images is associated with one of a plurality of discrete identified poses in the space. In image processing, a key-point is a spatial location, or a point in an image that defines what is interesting or what stand out in the image. To avoid ambiguity in training the plurality of region specific models, the plurality of images optionally have no overlaps, i.e. a first set of the plurality of images associated with a first of the plurality of discrete identified poses is selected such that any key-point identified in at least one of the first set is absent from all of a second set of the plurality of images associated with a second of the plurality of discrete identified poses. In 204, at least one hardware processor 111 optionally provides the first estimated device pose to at least one software object executed by the at least one hardware processor to perform a pose-oriented task. Optionally, the pose-oriented task comprises controlling movement of the at least one device in the space, for example when the device is an autonomous mechanical device. Some examples of an autonomous mechanical device are an autonomous land vehicle and an autonomous flying drone. Optionally, the pose oriented task comprises displaying at least one pose-related image, optionally on an object in the space, for example when the system is a virtual reality system or an augmented reality system. Optionally, the pose-oriented task comprises computing a path to an identified pose in the space, for example when the device is an autonomous vehicle. Another example of a pose-oriented task comprising computing a path to an identified pose in the space is a navigation system. Optionally, the pose-oriented task comprises computing one or more navigation instructions to the identified pose in space. Optionally, at least one hardware processor 111 sends one or more results of performing the pose-oriented task via at least one digital communication network interface 113, optionally to at least one other hardware processor 120. Optionally, at least one hardware processor 111 outputs one or more results of performing the pose-oriented task on the one or more display components connected to at least one hardware processor. Optionally, at least one hardware processor 111 outputs the one or more results on the one or more audio components connected to at least one hardware processor.

In 207, at least one hardware processor 111 optionally receives at least one other model, trained to compute another estimated device pose in a second identified region of the space. Optionally, the at least one other model is selected from the plurality of region specific models according to the first estimated device pose. Optionally, at least one hardware processor 111 receives the at least one other model from at least one other hardware processor 120, optionally via at least one digital communication network interface 113. In 210, at least one hardware processor 111 optionally uses the at least one other model in at least on other iteration of the plurality of iterations to compute a second estimated device pose in the second identified region of the space.

Figure 3:
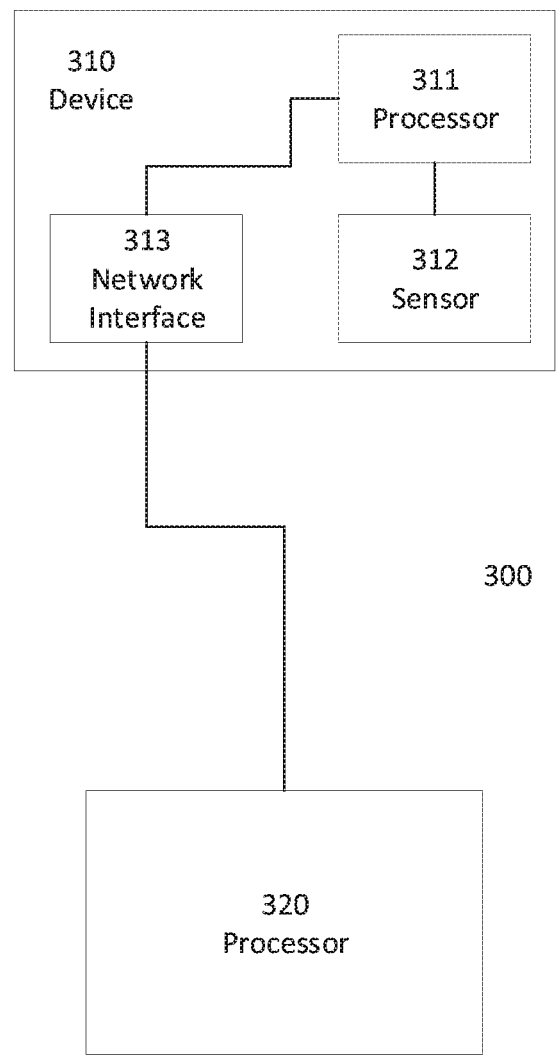
FIG. 3 is a schematic block diagram of an exemplary navigation system, according to some embodiments of the present invention.

In some embodiments of the present invention, a system for navigating in space uses one or more device poses computed according to the present invention. Reference is now made to FIG. 3, showing a schematic block diagram of an exemplary navigation system 300, according to some embodiments of the present invention. In such embodiments, system 300 comprises at least one device 310. Optionally, at least one device 310 comprises at least on hardware processor 311 optionally connected to at least one sensor 312. Optionally, at least one hardware processor 311 is electrically coupled to at least one sensor 312. Optionally, at least one sensor 312 is at least one imaging sensor, for example a camera. Optionally, at least one sensor 312 is selected from a group of sensors comprising a microphone, a radar, a far infra-red (FIR) sensor, a passive infra-red (PIR) sensor, a LIDAR, an acceleration sensor, and a velocity sensor. Optionally, at least one hardware processor 311 is connected to at least one digital communication network interface 313. Optionally, at least one hardware processor 311 is electrically coupled to at least one digital communication network interface 313. Optionally, at least one digital communication network interface 313 is connected to at least one wireless digital communication network, for example a wireless network based on one or more of the Institute of Electrical and Electronics Engineers (IEEE) 802.11 family of protocols (Wi-Fi), or a Bluetooth Special Interest Group Bluetooth network. Optionally, at least one digital communication network interface 313 is connected to at least one cellular network, for example a code-division multiple access (CDMA) network, a Global System for Mobile communications (GSM) network, a Universal Mobile Telecommunications System (UMTS) network, or a Long Term Evolution (LTE) network. Optionally, at least one hardware processor 311 is connected to at least one other processor 320 via at least one digital communication network interface 313, for example for the purpose of outputting an estimated device pose. Optionally, at least one hardware processor 311 receives one or more models from at least one other hardware processor 320, optionally for the purpose of computing one or more estimated device poses.

Figure 4:
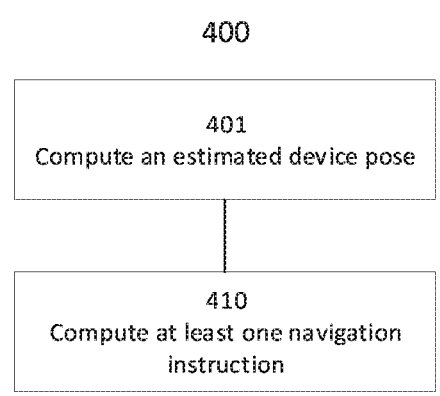
FIG. 4 is a flowchart schematically representing an optional flow of operations for navigation, according to some embodiments of the present invention.

To navigate in space, in some embodiments of the present invention system 300 implements the following optionally method. Reference is now made to FIG. 4, showing a flowchart schematically representing an optional flow of operations 400 for navigation, according to some embodiments of the present invention. In such embodiments at least one hardware processor 311 executes a plurality of iterations. In each of the plurality of iterations, in 401 at least one hardware processor 311 optionally computes an estimated device pose. Optionally, at least one hardware processor implements method 200 to compute the estimated device pose. In 410, at least one hardware processor 311 optionally computes at least one navigation instruction according to the estimated device pose. Optionally, at least one hardware processor 311 outputs the at least one navigation instruction, for example on a display component, such as a screen, optionally connected to at least one hardware processor 311. In another example, at least one hardware processor 311 may output the at least one navigation instruction via an audio component, such as a speaker, optionally connected to at least one hardware processor 311. Optionally, at least one hardware processor 311 provides the at least one navigation instruction to at least one controller for the purpose of controlling one or more mechanical components of device 310, for example a motor or a rudder. The at least one controller optionally comprises at least one hardware controller. Optionally, the at least one controller comprises one or more controller software objects executed by at least one hardware processor 311.

Figure 5:
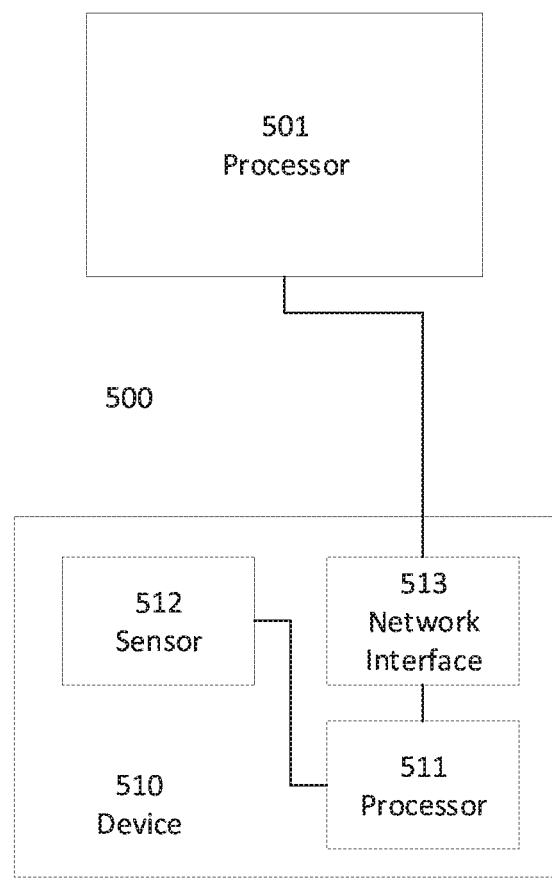
FIG. 5 is a schematic block diagram of an exemplary system for providing a plurality of models, according to some embodiments of the present invention.

In some embodiments of the present invention, a system for providing the plurality of region specific models to one or more devices uses one or more estimated device positions computed according to the present invention. Reference is now made also to FIG. 5, showing a schematic block diagram of an exemplary system 500 for providing a plurality of models, according to some embodiments of the present invention. In such embodiments, at least one hardware processor 501 is connected to at least one device 510. Optionally, at least one device 510 comprises at least one device hardware processor 511, connected to at least one sensor 512. Optionally, at least one hardware processor 501 is connected to at least one device 510 via at least one digital communication network interface 513, connected to at least one device hardware processor 511. Optionally at least one hardware processor 501 is connected to at least one device 510 via at least one digital communication network interface 513 for the purpose of receiving one or more message from at least one device 510 and in addition or alternatively for the purpose of sending one or region specific models to at least one device 510. Optionally, at least one digital communication network interface 513 is connected to at least one wireless digital communication network, for example a Wi-Fi network or a Bluetooth Special Interest Group Bluetooth network. Optionally, at least one digital communication network interface 513 is connected to at least one cellular network, for example a CDMA network, a GSM network, a UMTS network, or an LTE network. Optionally, at least one device 510 moves in a space. Optionally, at least one device 510 moves in the space by being mounted to a vehicle moving in the space. Optionally, the vehicle is an autonomous vehicle. Some examples of an autonomous vehicle are an autonomous land vehicle and an autonomous flying drone.

To provide the plurality of region specific models, in some embodiments of the present invention system 500 implements the following optional method.

Figure 6:
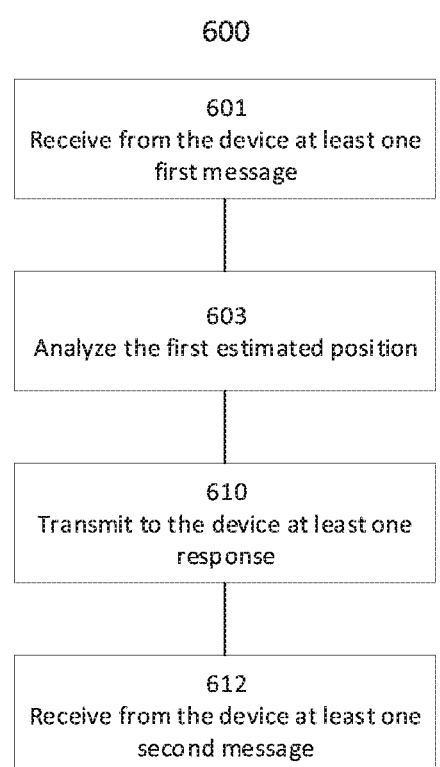
FIG. 6 is a flowchart schematically representing an optional flow of operations for providing a plurality of models, according to some embodiments of the present invention.

Reference is now made also to FIG. 6, showing a flowchart schematically representing an optional flow of operations for providing a plurality of models, according to some embodiments of the present invention. In such embodiments, while at least one device 510 is moving from a first position of at least one device 510 in a space to a second position of at least one device 510 in the space, in 601 at least one hardware processor receives from at least one device 510 at least one first message comprising a first estimated position, estimating the first position of the device in the space. Optionally, the at least one first message further comprises an estimated orientation, associated with the first estimated position. Optionally, the first estimated position and the estimated orientation form a first estimated pose of at least one device 510 in the space. In 603, at least one hardware processor 501 optionally analyzes the first estimated position to determine at least one relevant region of the space. When the at least one first message comprises the estimated orientation forming, with the first estimated position, the first estimated pose, at least one hardware processor 501 optionally analyzes the first estimated pose to determine the at least one relevant region of the space. In 610, at least one hardware processor optionally transmits to at least one device 510 at least one response comprising at least one relevant region specific model associated with the at least one relevant region of the space. Optionally, the at least one relevant region specific model is one of a plurality of regions specific models, each trained to compute an estimated device pose in one of a plurality of regions of the space. In 612, at least one hardware processor optionally receives from at least one device 510 at least one second message comprising a second estimated position, estimating the second position of at least one device 510 in the space. Optionally, at least one device 510 implements method 200 to compute a first estimated pose and a second estimated pose. Optionally, the first estimated pose comprises the first estimated position. Optionally, the second estimated pose comprises the second estimated position.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors, pose-oriented tasks, and digital communication networks will be developed and the scopes of the terms "sensor", "pose-oriented task" and "digital communication network interface" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein in its/their entirety.

What is claimed is:

1. A system for estimating a plurality of device poses in a space, comprising:
    at least one device, comprising at least one hardware processor connected to at least one sensor and adapted to:
    in at least one of a plurality of iterations:
        using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space;
        providing the first estimated device pose to at least one software object executed by the at least one hardware processor to perform a pose-oriented task;
        receiving at least one other model trained to compute another estimated device pose in a second identified region of the space and selected from the plurality of region specific models according to the first estimated device pose; and
        using the at least one other model in at least one other iteration of the plurality of iterations to compute a second estimated device pose in the second identified region of the space.

2. The system of claim 1, wherein the at least one model is a neural network.

3. The system of claim 1, wherein the at least one hardware processor is adapted to receiving the at least one other model from at least one other hardware processor via at least one digital communication network interface connected to the at least one hardware processor.

4. The system of claim 3, wherein the at least one digital communication network interface is connected to at least one wireless digital communication network.

5. The system of claim 4, wherein the at least one digital communication network interface is selected from a group of network interfaces consisting of: a Bluetooth network interface, a network interface based on at least one protocol of Institute of Electrical and Electronics Engineers 802.11 (IEEE 802.11) family of protocols, a Global System for Mobile communications (GSM) network interface and a Long Term Evolution (LTE) network interface.

6. The system of claim 1, wherein the at least one sensor is at least one imaging sensor;
    wherein the at least one signal is at least one digital image captured by the at least one imaging sensor; and
    wherein each of the plurality of region specific models, trained to compute an estimated device pose in one of a plurality of regions of the space, is trained with a plurality of images of respective region of the space.

7. The system of claim 6, wherein the plurality of images of respective region of the space comprises a plurality of captured images captured by at least one other imaging sensor.

8. The system of claim 6, wherein the plurality of images of respective region of the space comprises a plurality of synthetic images generated by at least one rendering engine.

9. The system of claim 1, wherein the first estimated device pose is relative to a coordinate system of a Global Positioning System (GPS).

10. The system of claim 1, wherein the first estimated device pose is relative to an identified coordinate system of the space.

11. The system of claim 1, wherein the space is interior to a building.

12. The system of claim 1, wherein the pose-oriented task comprises controlling movement of the at least one device in the space.

13. The system of claim 1, wherein the pose-oriented task comprises computing a path to an identified pose in the space.

14. The system of claim 1, wherein the pose-oriented task comprises displaying at least one pose-related image on an object in the space.

15. A method for estimating a plurality of device poses in a space, comprising executing on at least one hardware processor of a device code adapted to:
    in at least one of a plurality of iterations:
        using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space;
        providing the first estimated device pose to at least one software object executed by the at least one hardware processor to perform a pose-oriented task;
        receiving at least one other model trained to compute another estimated device pose in a second identified region of the space and selected from the plurality of region specific models according to the first estimated device pose; and
        using the at least one other model in at least one other iteration of the plurality of iterations to compute a second estimated device pose in the second identified region of the space.

16. A system for navigating in a space, comprising:
    at least one device, comprising at least one hardware processor connected to at least one sensor and adapted to:
    in each of a plurality of iterations:
        computing an estimated device pose; and
        computing at least one navigation instruction according to the estimated device pose;
    wherein computing the estimated device pose comprises:
        in at least one of the plurality of iterations:
            using at least one model to compute a first estimated device pose in a first identified region of the space in response to at least one input signal captured by the at least one sensor, where the at least one model is one of a plurality of region specific models, each trained to compute an estimated device pose in one of a plurality of regions of the space;

providing the first estimated device pose to at least one software object executed by the at least one hardware processor to perform a pose-oriented task;

receiving at least one other model trained to compute another estimated device pose in a second identified region of the space and selected from the plurality of region specific models according to the first estimated device pose; and using the at least one other model in at least one other iteration of the plurality of iterations to compute a second estimated device pose in the second identified region of the space.

17. A system for providing a plurality of region specific models, comprising:

at least one hardware processor executing a code adapted to:

for each of one or more devices connected to the at least one hardware processor, while the device is moving from a first position of the device in a space to a second position of the device in the space:

receiving from the device at least one first message comprising a first estimated position, estimating the first position of the device in the space;

analyzing the first estimated position to determine at least one relevant region of the space;

transmitting to the device at least one response comprising at least one relevant region specific model associated with the at least one relevant region of the space; and receiving from the device at least one second message comprising a second estimated position, estimating the second position of the device in the space.

18. The system of claim 17, wherein at least one of the one or more devices is moving from the first position in the space to the second position in the space by being mounted to a vehicle moving in the space.

19. The system of claim 17, wherein at least one of the one or more devices is an autonomous vehicle moving in the space.

20. The system of claim 19, wherein the autonomous vehicle is selected from a group of autonomous vehicles consisting of: an autonomous land vehicle, and an autonomous flying drone.

21. The system of claim 17, wherein the at least one first message further comprises an estimated orientation, associated with the first estimated position to form a first estimated pose of the device; and wherein the at least one hardware processor is further adapted to execute a code for analyzing the first estimated pose to determine the at least one relevant region of the space.

22. The system of claim 17, wherein the at least one of the one or more devices comprises at least one device hardware processor adapted to:

in at least one of a plurality of iterations:

using at least one region specific model to compute a first estimated device pose in a first identified region of the space in response to at least one input signal captured by at least one sensor, where the at least one region specific model is one of a plurality of region specific models, each trained to compute an estimated device pose in one of a plurality of regions of the space;

providing the first estimated device pose to at least one software object executed by the at least one device hardware processor to perform a pose-oriented task;

receiving at least one other region specific model trained to compute another estimated device pose in a second identified region of the space and selected from the plurality of region specific models according to the first estimated device pose; and using the at least one other region specific model in at least one other iteration of the plurality of iterations to compute a second estimated device pose in the second identified region of the space;

wherein the first estimated device pose comprises the first estimated position; and wherein the second estimated device pose comprises the second estimated position.

\* \* \* \* \*